INVENTORS
ROBERT W. CAPRON
E. CALVIN JOHNSON
BY
AGENT

June 7, 1960  R. W. CAPRON ET AL  2,939,287
TRACER CONTROL SYSTEM
Filed May 25, 1956  3 Sheets-Sheet 3

INVENTORS
ROBERT W. CAPRON
BY E. CALVIN JOHNSON
AGENT

2,939,287

TRACER CONTROL SYSTEM

Robert W. Capron and E. Calvin Johnson, Detroit, Mich., assignors to Bendix Aviation Corporation, Detroit, Mich., a corporation of Delaware Filed May 25, 1956, Ser. No. 587,291

2 Claims. (Cl. 60—97)

This invention pertains to machine tools and more particularly to a cutting tool position control system for duplicating lathes.

When a number of identical parts must be produced on a machine tool, such as a lathe or milling machine, it is often economical to provide an automatic cutting tool position control system which will relieve the machine's operator of the task of varying the tool's position in accordance with the desired dimensions. Such systems use a model finished part or template to indicate these desired dimensions. A tracing stylus bears on the template and is mechanically connected to the cutting tool so as to move with it. A transducer contained in the stylus provides a signal that is proportional to the position of the stylus with respect to the template and also proportional to the deviation of the stylus and, therefore, the tool from an ideal position. This signal operates through a servomechanism system to control the position of the tool slide.

When such a tool position control system is used on a lathe the tool slide is normally moved in a direction parallel to the workpiece's axis at a constant rate and the tracer control is often used to vary the tool position along a direction perpendicular to the axis of the workpiece. This type of system has the basic disadvantage of having a cutting speed that varies with the slope of the cut being made. Thus, when making a plunge cut, i.e., one in a direction perpendicular to the rotational axis, the tracer control might provide a theoretical infinite cutting speed. Therefore, the angle of cut that can be made with the single axis type tracer control must be limited and the axial feed rate must be restricted to a value less than the maximum cutting speed.

It is also apparent that a tracer system which only has single axis control cannot trace patterns that require a reverse motion on the longitudinal axis. Yet many common turned parts require such a cut.

Systems have been developed which provide a constant cutting speed and which will follow patterns having reverse slopes but they are all of a complex nature. They generally involve circuits which require at least two stylus signals representing components of the stylus' position with respect to the template. Because of their complexity, such devices are costly and difficult to maintain.

The present invention solves the foregoing problems through use of a circuit which provides servo control of both cutting axes. A single positional signal from a tracing stylus controls the rate of motion along one axis directly and the rate of motion along the other axis indirectly. The resultant motion will follow obtuse angles within certain limits and also at a rate that is approximately constant, independent of the shape being cut.

It is, therefore, an object of the present invention to provide a tracer type tool position control system for machine tools.

Another object of the present invention is to provide a tracer type tool position control system in which the cutting speed is largely independent of the slope of cut.

It is a further object of the present invention to provide a tracer control system which can follow patterns which include obtuse angles.

A further object of the present invention is to provide a tool position control system which is relatively simple in construction so as to be susceptible to economic manufacture and ease of maintenance.

A further object is to provide a system which may operate with a stylus that provides a single output signal.

A still further object is to provide a tracer tool position system that controls the feed rate of the tool along two axes with a single stylus signal.

Other objects, applications and advantages of the present invention will be made apparent by the following detailed description of one embodiment of the invention. That description makes reference to the accompanying drawings in which.

Figure 4:
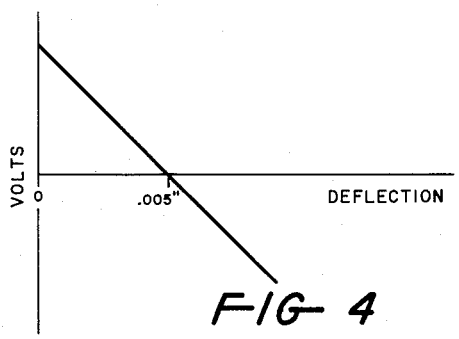
Figure 5:
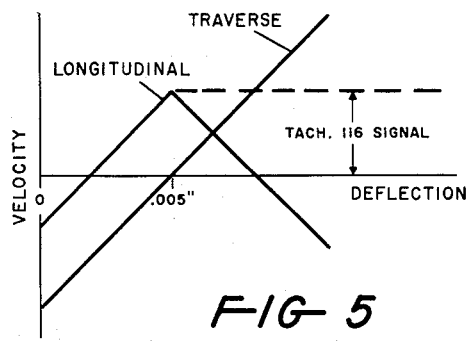
Figure 6:
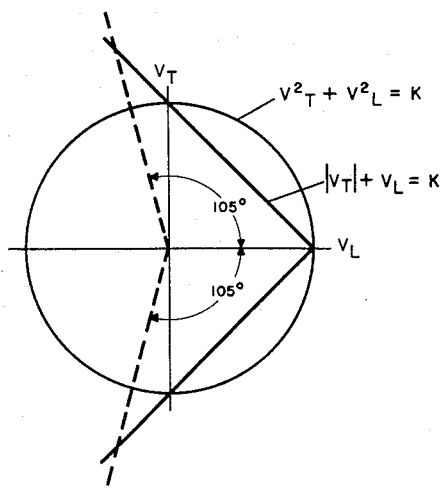

Figures 4, 5, and 6 are graphs indicating the method of operation of the system.

In an embodiment of the invention a workpiece 10 is held in a chuck 12 and supported by a dead center 14. The chuck is revolved by an electric motor 16. A cutting tool 18 is supported on a tool post 20 which is manually adjustable along a T-slot 22 in a transverse feed block 24. The bottom surface of the block 24 has a dovetail groove which mates with a dovetail tongue 26 on a longitudinal slide block 28. A hydraulic traverse feed motor 30 is also mounted on the longitudinal slide block 28. The motor's rotation moves the traverse feed block 24 through a screw 32. The longitudinal slide 28 has a dovetail groove on its bottom surface which mates with a tongue 34 on the lathe bed. The slide 28 moves along this tongue under the power of a longitudinal hydraulic feed motor 36 which acts through a screw 38. The motion of the tool post 20 is therefore the resultant of the motions of the traverse feed block 24 and the longitudinal feed block 28 as produced by their motors 30 and 36, respectively.

An adjustable mechanical linkage 40 connects a tracer stylus 42 to the tool post 20 so that the stylus follows the motion of the tool 18. The stylus tip 44 is positioned adjacent to a two dimensional template 46 which has a shape that is the equivalent of a cross-section through an ideal finished workpiece. The positional relationships of the tool 18, the workpiece, the stylus tip 44 and the template 46 are such that the tool is in the correct cutting position relative to the workpiece when the stylus tip is deflected a predetermined amount as a result of its contact with the template.

Figure 2:
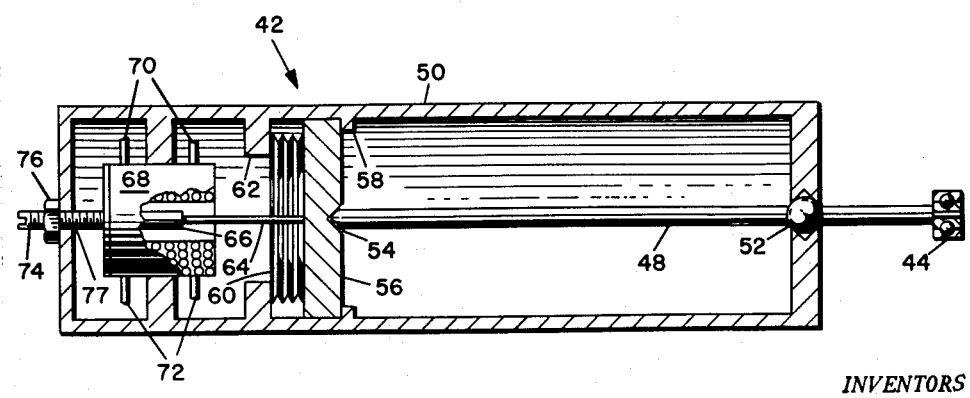
Figure 2 is a sectional view of an embodiment of a tracing stylus suitable for use in the embodiment.

As shown in Figure 2, the stylus tip 44 is the outer race of a ball bearing which is carried on the end of a shaft 48. The shaft is pivotably supported in the stylus housing 50 by a ball and socket joint 52. At its other end the shaft 50 is supported in a wedged hole 54 in a cylindrical block 56. The block is constrained against a shoulder 58 in the housing 50 by a spring 60 which bears against a second shoulder 62.

Because of the ball bearing tip 44 the friction between the stylus and the template 46 is negligible. Therefore, the tip 44 is always deflected at right angles to the template edge being followed. This motion is translated into an axial movement of the block 56 because of the action of the shaft 48 against the wedge 54. The block moves against the spring 60 through a distance that is directly proportional to the deflection of the tip 44 for small movements. A rod 64 communicates this motion of the block 56 to the armature 66 of a linear variable differential transformer 68. The transformer acts as a transducer to convert the motion of its armature, and hence the deflection of the tip 44, into a change in its output voltage (secondary winding) which is tapped from the leads 70. The input to the transducer (primary winding) may be a 60 cycle current of a low voltage (1–10 volts) brought in through the leads 72. The output is, therefore, a 60 cycle voltage, the magnitude of which varies in accordance with the position of the armature 66.

The position of the transformer 68 with respect to its armature 66 may be adjusted through a screw 74 which may be locked by a nut 76 against a threaded hole 77 in the stylus wall 50. Initially, the transformer 68 is adjusted so that the armature 66 is displaced relative to the transformer a particular distance from its neutral position or zero signal position so that the transformer produces a relatively large signal even though the tip 44 has zero deflection as shown in Figure 4. The deflection of the tip 44 by the template 46 causes the armature 66 to move toward its neutral position thus reducing the transformer output to zero. In Figure 4, this occurs at .005″ tip deflection. As the tip 44 is further deflected so that the armature passes through its neutral position, the transformer output increases in a reverse phase relationship as shown in Figure 4. The reason for this initial adjustment will appear subsequently.

Figure 1:
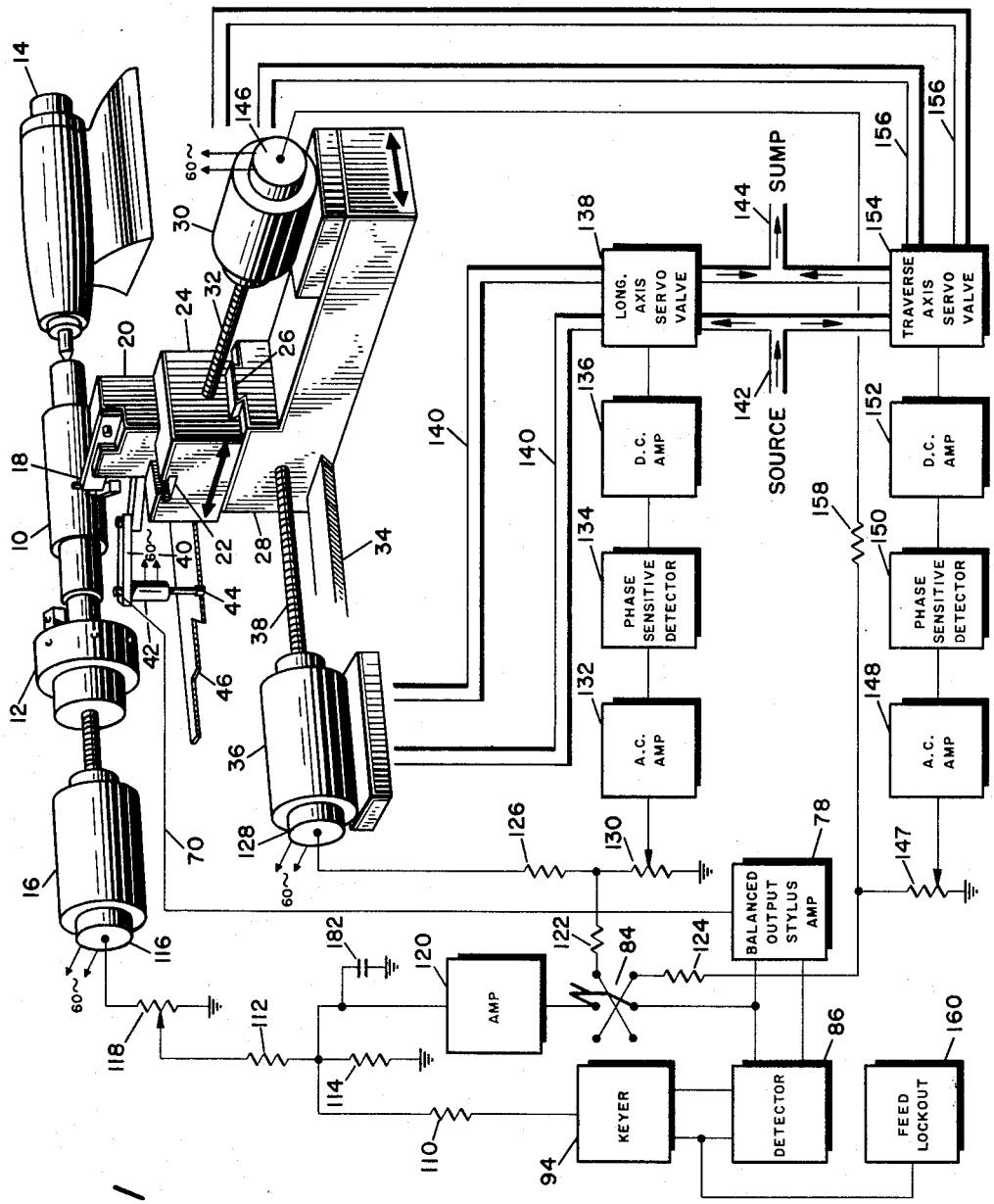
Figure 1 is a partially perspective, partially block representation of an embodiment of the invention as applied to a horizontal lathe.
Figure 3:
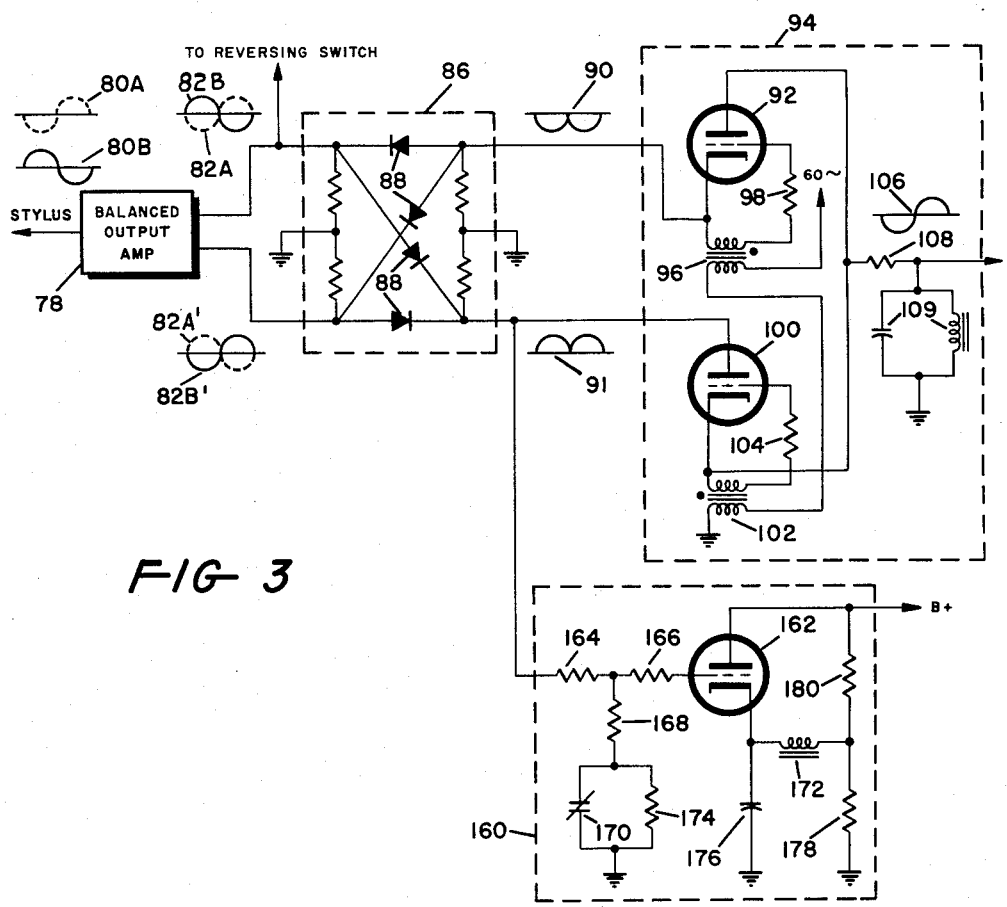
Figure 3 is a schematic view of a portion of the circuitry used in the embodiment.

The output 70 of the stylus 42 connects to the input of a balanced output amplifier 78 (Figures 1 and 3). The waveforms 80A and B in Figure 3 illustrate the two possible phases that the input from the stylus 42 may take depending on the amount of deflection of the tip 44. If the tip deflection is less than 0.005″ the phase of 80A is present and if the deflection is greater than that amount the phase reverses to that of 80B. When the output of the stylus has phase 80A, then the balanced output of the amplifier 78 takes the form 82A at the upper terminal and 82A′ at the lower terminal, 82A and 82A′ being 180° out of phase. Similarly the output of the amplifier 78 takes the form 82B and 82B′ when the stylus output has phase 80B. One side of this output goes to one terminal of a reversing switch 84 which will be discussed subsequently. Both sides of the output of the amplifier 78 connect to a balanced input detector system 86 which is shown in block in Figure 1 and in schematic in Figure 3. The detector employs rectifiers 88 in a double full wave circuit to provide a double sided output which constitutes two full wave rectified signals 90 and 91 which are the inverse of each other. The signals 90 and 91 always have the same polarity as shown in Figure 3 regardless of whether the input to the amplifier 78 is 82A and 82A′ or 82B and 82B′.

One of these outputs 90 is connected to the cathode of a triode vacuum tube 92 which is in the keyer circuit 94. The grid of the tube 92 is driven by the secondary of a low voltage 60 cycle transformer 96 through a resistor 98 so as to cut off the tube 92 during one-half cycle and to allow the tube to conduct during the other half cycle.

The other half of the detector output 91 is connected to the anode of a second triode vacuum tube 100. The grid of the tube 100 is driven by the secondary of a low voltage 60 cycle transformer 102 through a resistance 104 so as to only allow the tube to conduct during one-half of each cycle. The primaries of the grid control transformers 96 and 102 are connected in series and to a 60 cycle source in such a manner that the tubes 92 and 100 conduct during alternate half cycles.

The anode of tube 92 is connected to the cathode circuit of tube 100 to produce the output of 106. This is filtered through a resistor 108 which is bypassed to ground through a parallel resonant LC circuit 109 that is tuned to 60 cycles. The resultant output of the amplifier 78, the detector 86 and the keyer 94 is, therefore, seen to have a magnitude proportional to that of the input but independent of the phase of the input signal. This output will, therefore, be referred to as the absolute value of the stylus signal.

This absolute value signal is fed through a resistance 110 and added to the voltage fed through the resistance 112. The algebraic sum of these two voltages appears across a grounded resistance 114. The signal from the resistance 112 is obtained from an induction tachometer 116 that has a 60 cycle output which is proportional in magnitude to the speed of the motor 16. This output of the tachometer 116, which is normally constant, appears across a potentiometer 118. The resistance 112 is connected to the variable tap of the potentiometer.

The 60 cycle input to the tachometer 116 is of such a phase as to produce an output signal which is 180° out of phase with the stylus absolute value signal 106. When the tap is adjusted to the ungrounded end of pot 118, the voltage across the resistance 114 is, therefore, equal in magnitude to the difference in magnitude between the tachometer 116 signal and the absolute value of the stylus output signal.

This difference voltage is fed to an amplifier 120 which has its output connected to the second input terminal of the reversing switch 84. As was noted, the other input to the switch 84 is connected to the stylus amplifier 78. We, therefore, have two signals at the switch 84; one proportional to the stylus output and the other proportional to the lathe motor tachometer output (a constant) less the absolute value of the stylus output.

One of the output terminals of the reversing switch 84 connects through a resistance 122 to a servo circuit that controls the speed and direction of the longitudinal feed motor 36 in accordance with the input signal. The other switch terminal connects through a resistance 124 to a servo circuit that controls the speed and direction of the transverse feed motor 30 in accordance with the input signal.

The switch 84 is normally in the right hand position as viewed in Figure 1. In that status the amplified stylus signal is applied to the resistance 124 and the traverse motor 30 servo circuit while the difference signal from the amplifier 120 is applied to the resistance 122 and the longitudinal motor 36 servo control system. When the switch is in the left hand position the reverse connections are made.

The resistance 122 connects with the resistance 126 which is fed from a tachometer 128. The tachometer is driven by the longitudinal feed motor 36. The algebraic sum of these two signals appears across a potentiometer 130 which has its adjustable contact connected to an alternating current amplifier 132. The amplifier 132 connects to a phase sensitive detector 134 that rectifies the signal. A direct current amplifier 136 receives the output of the detector 134 and connects to a hydraulic servo valve 138. This valve controls the direction and flow of the fluid through the lines 140 in accordance with the magnitude and polarity of the signal it receives from the amplifier 136. The lines 140 connect to the longitudinal feed motor 36. The valve 138 receives fluid from a pump through line 142 and discharges fluid to a line 144. The tachometer 128 provides the feedback to the input amplifier 132 that creates servo action. Thus, the speed and direction of the motor 36 automatically adjusts itself to a value that is controlled by the signal that is impressed on the resistance 122.

In an identical manner the signal impressed on the resistance 124 controls the speed and direction of the traverse feed control motor 30. This signal is added to a signal from the tachometer 146 that is driven by the traverse feed motor 30. Their resultant appears across a potentiometer 147 which has its adjustable contact connected through an amplifier 148, a detector 150, and an amplifier 152 to a servo valve 154 that controls the flow through the lines 156. The lines 156 feed the motor 30 and the tachometer 146 feeds back a voltage proportional to the speed of the motor through a resistance 158 to complete the loop.

Another connection is made between the output of the stylus signal detector 86 and a feed lockout circuit 160. As is seen in Figure 3, the detected stylus signal is connected to the grid of a triode vacuum tube 162 through two resistances 164 and 166. The midpoint of the resistances 164 and 166 is connected to a third resistance 168. The other end of the resistance 168 connects to ground through two paths; the normally closed contacts 170 of a relay 172 that is in the cathode circuit of the tube 162, and a resistance 174. The resistances 164, 166 and 168 are of the same order of magnitude. For example, for a given tube 162, the resistances 164 and 168 may each be 100,000 ohms and the resistance 168 may be 50,000 ohms. The resistance 174 is much larger than the others. For the above values it is preferably 2,000,000 ohms. Therefore, when the contacts 170 are closed the stylus signal being passed to the grid of the tube 162 by the resistances 164 and 166 is attenuated greatly, but when the contacts 170 open upon the actuation of the relay 172, the resistance 174 is placed in series with the resistance 168 and the attenuation effect is eliminated.

The cathode of the tube 162 is grounded through a capacitance 176 and connects to the coil of the relay 172 which is grounded through a resistance 178 and connects to the plate of the tube 162 through a resistance 180. Therefore, the D.C. component of any current through the tube 162 must flow through the coil of the relay 172. The values of the circuitry are such that the current flow through the tube 162 becomes sufficient to energize the relay 172 only when the stylus signal is of sufficient magnitude to indicate that the stylus is completely out of contact with the template 46. When this occurs the relay 162 opens its normally closed contacts 170 in the grid circuit of the tube 162 and also closes its normally open contacts 182 which act to ground the input to the amplifier 120 (Figure 1). The contacts 170 when open stop the attenuating action of resistance network 164, 166, 168 and, therefore, effectively increase the signal to the grid of the tube 162 so that this signal must be reduced sufficiently to indicate that the stylus tip 44 is well into contact with the template 46 before the relay 172 will be de-energized. During this time, since the input to the amplifier 120 is grounded, no sginal is sent to the longitudinal axis motor 36 (when the switch 84 is in the right hand position. Likewise, no signal is sent to the traverse feed motor 30 when the switch 84 is in the left hand position since the switch acts to reverse the inputs to the two servo systems).

This feed cut-off feature is valuable so that the tool 18 may be brought directly into contact with the workpiece 10 automatically when a cut is started without producing a longitudinal cut.

As has been noted, the servo units control the speed of the feed motors 30 and 36 in accordance with their input signals. When the reversing switch 84 is in the normal right hand position the speed of the traverse feed motor 30 is therefore directly proportional to the output of the stylus 42; and the speed of the longitudinal feed motor 36 is directly proportional to a constant (the drive motor tachometer 116 signal) minus the stylus output. The resultant feed velocities for various stylus outputs are illustrated in Figure 5. When the switch 84 is in a left hand position the velocities of the motors exchange.

From the above it is apparent that:

$$V_L = V_{Lo} - |V_T|$$

where $V_L$ = Velocity of the longitudinal feed motor 36
$V_{Lo}$ = Velocity of the longitudinal feed motor 36 with no stylus signal
$|V_T|$ = Absolute value of the traverse feed motor 30 velocity This may be written as $$V_{Lo} = V_L + |V_T|$$

Since $V_{Lo}$ is a constant (1) $$V_L + |V_T| = K$$

In order to have a constant cutting speed independent of template slope angle, it would be necessary that:

(2) $$V_L^2 + V_T^2 = K$$

However, over a wide range of values (1) and (2) are approximately equal. Let relationship (1) between $V_T$ and $V_L$ be plotted as in Figure 6. If, at the point of contact with the stylus tip, the template edge makes an angle $\alpha$ with the traverse direction, the speeds $V_T$ and $V_L$ will be such that $$\tan \alpha = V_T/V_L$$

Then, in Figure 6, this angle $\alpha$ is also the angle between the $V_L$ axis and a line joining the origin to the point ($V_T$, $V_L$) on the curve representing relationship (1). If a deviation of the actual resultant from a constant resultant of as much as the square root of 2 is considered allowable, it is apparent that the present tool control system maintains that relationship for template slopes up to 105° to each side of a straight cut (no traverse feed).

The tracer position control system is placed in operation when an operator inserts a workpiece 10 and a template 46 into the machine. Initially the stylus 44 will be out of contact with the template 46, therefore, in accordance with Figure 4 the stylus will generate a relatively large output signal. This signal will be operated on by the amplifier 78 and the detector 86 and will actuate the feed lockout circuit 160 so as to energize the relay 172. The contact 182 of the relay 172 will, therefore, close and short out the signal to the amplifier 120. Assuming the switch 184 is in the normal right hand position there will then be no signal to the longitudinal feed motor 36. However, the output of the amplifier 78 will be fed to the servo controlling the traverse feed motor 30. Therefore, the tool post 20 will be moved directly in towards the workpiece 10 at right angles to the workpiece's axis. This motion will continue until the stylus 44 comes into contact with the template 46. When the output signal of the stylus 44 becomes small enough the relay 172 will be de-actuated opening its contact 182 and sending a longitudinal feed signal, which represents the difference between the amplified output of the tachometer 116 and the amplified output of the stylus 42, to the longitudinal servo feed motor 36.

As the longitudinal feed motor 36 moves the longitudinal slide 28 and the tool post 20 along the workpiece 10, the tracing stylus 42 will follow a similar path along the template 46. The variations in the shape of the template 46 will move the stylus tip 44 so as to generate signals that will directly control the position of the stylus 42 and the tool 18 in such a manner as to bring the stylus and the tool into a correct position with respect to the template 46. Whenever the stylus 42 puts out a signal which will actuate the traverse feed motor 30, the same signal is subtracted from the tachometer 116 signal in order to slow the motion of the longitudinal feed motor 36.

The invention thereby achieves control of two rectangular axes through use of a single stylus output signal. The manner of the control is such that the cutting speed of the tool 18 closely approximates a constant value over a wide range of template 46 angles. Upon the output of the sufficiently large signal from the stylus 42 to indicate a reversal in the slope of the template 46, the stylus signal overrides the output signal from the tachometer 116 so as to reverse the motion of the longitudinal feed motor 36. The control system will, therefore, follow reversals in the template within a limited range that is a function of the servo system constant.

The reversing switch 84 is placed in a left hand position when it is desirable to contour a workpiece in a plane perpendicular to the normal plane of operation. That is, the workpiece would be normally held in the chuck 12 alone, the dead center 14 not being used and the normal contouring action of the cutting tool 18 would take place in a direction parallel to the axis of the workpiece while the normally constant feed direction would be in an axis perpendicular to the axis of the workpiece.

Having thus described our invention, we claim:

1. A system for automatically controlling the movement of a body along first and second coordinates by means of an error signal measuring the positional error along the first coordinate as generated by a stylus displaced by a template, including, a stylus for generating an alternating electric error signal of one phase for stylus displacements less than a particular amount and of opposite phase for displacements greater than the particular amount, a first motor for moving the body along the first coordinate at a rate proportional to the amplitude of the error signal, a first electrical circuit for receiving the error signal and for producing at its output two equal opposite phase alternating voltages having an amplitude proportional to the amplitude of the error signal, a second electrical circuit for receiving the output of the first electrical circuit and producing at its output two full-wave rectified voltages of opposite polarity having an amplitude proportional to the amplitude of the error signal, a third electrical circuit for receiving the output of the second electrical circuit and for producing at its output an absolute value signal of alternating voltage having an amplitude proportional to the amplitude of the error signal and having a phase which is always the same regardless of the phase of the error signal, means for generating a constant signal of alternating voltage having a substantially constant amplitude, comparing means for comparing said constant signal and said absolute value signal, a second motor for moving the body along the second coordinate, and means to drive said second motor corresponding to the signal from said comparing means.

2. The system claimed in claim 1, including means for setting the amplitude of said constant signal at continuously variable values.

References Cited in the file of this patent

UNITED STATES PATENTS

| | | |
|---|---|---|
| 2,228,902 | Allen | Jan. 14, 1941 |
| 2,395,525 | Wilkie | Feb. 26, 1946 |
| 2,437,603 | Hornfeck | Mar. 9, 1948 |